United States Patent
Kametani et al.

(10) Patent No.: US 9,621,291 B2
(45) Date of Patent: Apr. 11, 2017

(54) OPTICAL COMMUNICATION CROSS-CONNECTION DEVICES AND SIGNAL PROCESSING METHOD THEREOF

(71) Applicant: MITSUBISHI ELECTRIC CORPORATION, Chiyoda-ku (JP)

(72) Inventors: Soichiro Kametani, Chiyoda-ku (JP); Kazuo Kubo, Chiyoda-ku (JP); Kazuumi Koguchi, Chiyoda-ku (JP); Yoshiaki Konishi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/787,663

(22) PCT Filed: Jun. 18, 2013

(86) PCT No.: PCT/JP2013/066679
§ 371 (c)(1),
(2) Date: Oct. 28, 2015

(87) PCT Pub. No.: WO2014/203324
PCT Pub. Date: Dec. 24, 2014

(65) Prior Publication Data
US 2016/0087739 A1  Mar. 24, 2016

(51) Int. Cl.
*H04Q 11/00* (2006.01)
*H04J 3/16* (2006.01)
*H04J 3/06* (2006.01)

(52) U.S. Cl.
CPC .......... *H04J 3/1652* (2013.01); *H04J 3/0691* (2013.01); *H04J 2203/0007* (2013.01)

(58) Field of Classification Search
CPC ................................................. H04Q 11/0001
See application file for complete search history.

(56) References Cited

U.S. PATENT DOCUMENTS

2011/0229133 A1  9/2011  Katagiri et al.
2011/0255552 A1*  10/2011  Ellegard ............... H04J 3/1652
370/419

(Continued)

FOREIGN PATENT DOCUMENTS

JP  2010-114765 A  5/2010
JP  2011-199548 A  10/2011
WO  WO 2011/058597 A1  5/2011

OTHER PUBLICATIONS

International Search Report issued Jul. 23, 2013, in PCT/JP2013/066679 filed Jun. 18, 2013.

(Continued)

*Primary Examiner* — Shi K Li
(74) *Attorney, Agent, or Firm* — Oblon, McClelland, Maier & Neustadt, L.L.P.

(57) ABSTRACT

Provided is an optical communication cross-connection device for exchanging an OTN signal through optical communications, including: a plurality of OTN signal processing units (OTNsp units) for asynchronously conducting OTN signal processing; and a space switch connected between the plurality of OTNsp units, for conducting bidirectional signal exchange for the OTN signal, in which a first and a second OTNsp units that conduct signal transmission among the plurality of OTNsp units subject the OTN signal to skew processing on one side and deskew processing corresponding to the skew processing on another side between the first and second OTNsp units or between a communicating end-side one of the first and second OTNsp units and a communicating end-side OTNsp unit of an optical communication cross-connection device of a communication counterpart destination for the optical communication cross-connection device, and share a clock for the signal transmission therebetween.

7 Claims, 10 Drawing Sheets

(56) References Cited

U.S. PATENT DOCUMENTS

2012/0128368 A1 5/2012 Onohara et al.
2012/0281985 A1 11/2012 Honma et al.
2013/0084063 A1* 4/2013 Hu .......................... H04L 49/10
398/2

OTHER PUBLICATIONS

ITU-T, Recommendation G. 707/Y.1322, "Network node interface for the synchronous digital hierarchy (SDH)", Series G: Transmission Systems and Media, Digital Systems and Networks, Digital terminal equipments—General, Series Y: Global Information Infrastructure, Internet Protocol Aspects and Next-Generation Networks, (Jan. 2007), 195 pages.
ITU-T, Recommendation G.709/Y.1331, "Interfaces for the Optical Transport Network (OTN)", Series G: Transmission Systems and Media, Digital Systems and Networks, Digital terminal equipments—General, Series Y: Global Information Infrastructure, Internet Protocol Aspects and Next-Generation Networks, (Dec. 2009), 216 pages.
Masashi Kono et al., "A 400-Gb/s and Low-power Physical-layer Architecture for Next-generation Ethernet", ICC 2011—2011 IEEE International Conference on Communications—Jun. 5-9, 2011—Kyoto, Japan, IEEE, Piscataway, NJ, XP031908504, ISBN: 978-1-61284-232-5, pp. 1-6.
European Search Report mailed Jan. 18, 2017 in European Application No. 13887327.8.
Stephen J. Trowbridge et al., Lucent Technologies USA, "Enabling use of 40 GbE and 100 GbE optical modules for transport of OTU3 and OTU4", vol. 11/15, May 23, 2008, pp. 1-12, XP017535919.

* cited by examiner

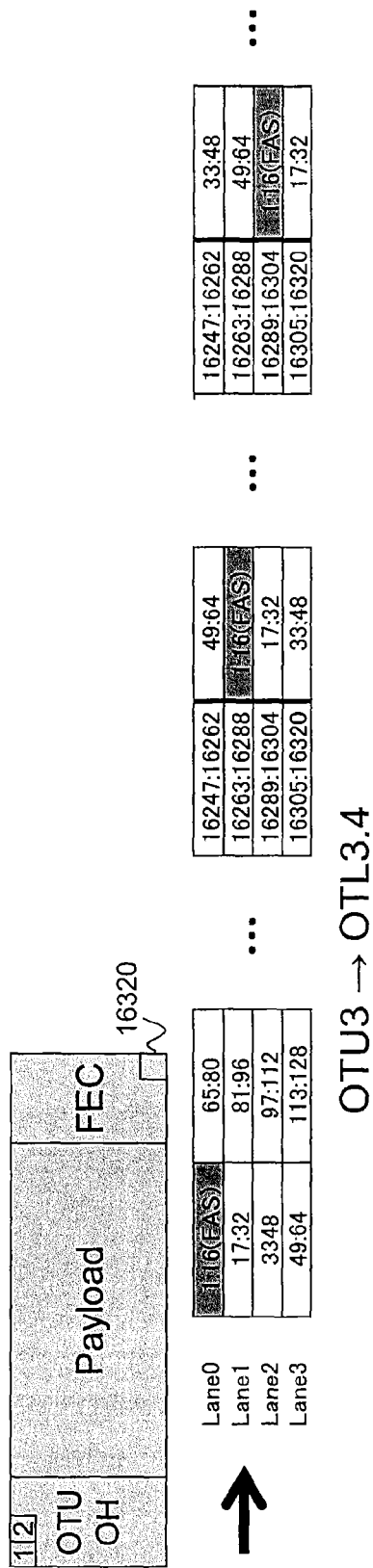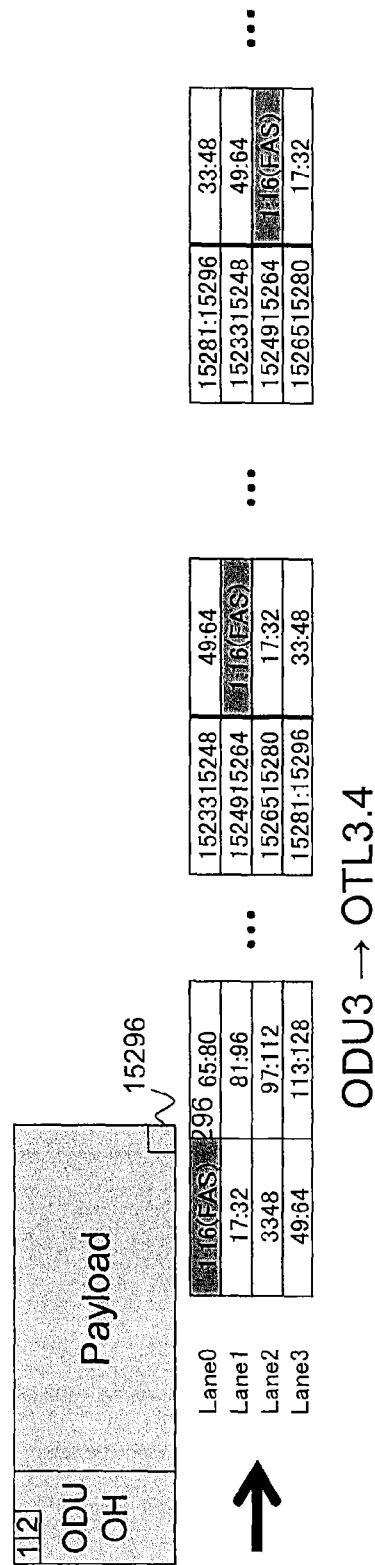

ODU FRAME

OTU FRAME

OPTICAL COMMUNICATION CROSS-CONNECTION DEVICES AND SIGNAL PROCESSING METHOD THEREOF

TECHNICAL FIELD

The present invention relates to an optical communication cross-connection device and the like to be used for optical communications.

BACKGROUND ART

In developmental processes of optical networks, various signal frames have been standardized in terms of signal speed. In a synchronous optical network/synchronous digital hierarchy (SONET/SDH) method disclosed in Non Patent Literature 1, STM (synchronous transport module)-1 for accommodating a 150-Mbps signal has been used as a standard, and subsequently, STM-4 (600 Mbps), STM-16 (2.4 Gbps), and STM-64 (10 Gbps) signals each corresponding to a transmission speed increasing four-fold have been used as standards. The SONET/SDH method is configured so that a payload area for containing information to be transmitted and a transmission information header are added to data having a fixed frame length. Those signals are mainly exchanged as electrical signals, and in that case, signals at the same hierarchy are exchanged. In that case, in SONET/SDH, clocks used for data transmission are synchronized among all nodes, to thereby prevent inconsistency in the data speed from occurring between the signals to be exchanged.

On the other hand, an optical transport network (OTN) method disclosed in Non Patent Literature 2 for adding error correction information in order to improve a signal-to-noise ratio tolerance in an optical transmission line has become mainstream in recent years. In FIGS. 9A and 9B, frame structures used in the OTN method are illustrated. An optical-channel data unit (ODU) frame is illustrated in FIG. 9A, and an optical-channel transport unit (OTU) frame is illustrated in FIG. 9B. In the OTN method, an OTU is defined so as to share a header area with an optical-channel data unit (ODU) header area of an ODU, which is obtained by adding the transmission information header to a payload area (optical-channel payload unit; OPU) for containing the information to be transmitted, and further so as to have added thereto (forward) error correction parity information (forward error correction; FEC). "OH" (overhead) represents control information (maintenance overhead), and "FA" (frame alignment) represents frame alignment.

In the OTN method, transmission rates such as ODU1/OTU1 (2.5 Gbps), ODU2/OTU2 (10 Gbps), ODU3/OTU3 (40 Gbps), and ODU4/OTU4 (100 Gbps) are currently defined based on their transmission speeds.

In the optical network, in order to allow those signals to coexist, a ladder structure is designed so as to allow each transmission frame to accommodate transmission frames at lower-level speeds in multiple hierarchies. For example, STM (synchronous transport module)-4 can accommodate four STM-1 signals, and an OTU4 signal can accommodate ten OTU2 signals.

FIG. 10 is a diagram for illustrating an example of a case where OTU3 accommodates an ODU2 signal. The payload area (OPU3) of OTU3 is formed by using four ODTU (optical channel data tributary units) 23's or sixteen ODTU3.ts's. In the former case, ODTU23s and OTU2s are allocated to each other on a one-to-one basis, and in the latter case, four signals (TSs) obtained by demultiplexing the ODU2 signal are allocated to four ODTU3.ts's as illustrated in the figure.

Those signals have the same frame length and frame structure at all the hierarchies, but the transmission speed itself of the signal is not an integral multiple of the transmission speed of a lower-level hierarchy so that a higher-level hierarchy signal (HO-ODU) allows a header part of a lower-level hierarchy signal (LO-ODU) to be transmitted as well. Further, in the OTN, the respective optical paths for transmission as LO-ODUk and HO-OTUj operate within a scope that does not depart from a jitter specification described in G.709, and hence even at the same hierarchy, clocks thereof are not always synchronized.

In recent years, the transmission speed has reached a speed as high as 100 Gbps. Therefore, there is a tendency that devices that exchange those signals increase in circuit scale. Further, even when a low-speed signal is subjected to parallelization in order to undergo the signal transmission within the device, parallel signal transmission itself increases in speed in order to prevent the device itself from increasing in scale, which causes a problem in skew compensation between parallel signals. In addition, various signal speeds are mixed in a situation in which transmission frames having a fixed length are continuously transmitted, and hence there is a demand for a device configuration ensuring consistent clock of those signals.

According to the configuration presented in Patent Literature 1, an LO-ODUk signal to be exchanged is divided in units of ODTU4.ts of a device system, and asynchronously accommodated in a common frame operating in accordance with a clock common to the device system. The signal exchange is realized for a device by cross-connection of a common frame group based on a switch of a time-division method operating in accordance with the clock common to the device system. At a time of being multiplexed in an HO-ODUj signal output from a signal exchange device, the cross-connected signal is subjected to signal transfer from the common frame onto ODTUjk or ODTUj.ts of the HO-ODUj signal. In this case, the HO-ODUj signal differs in the transmission rate depending on a value of j as described above, and hence the signal transfer is transfer using an asynchronous accommodation circuit.

With the method of Patent Literature 1, while the signal exchange in units of ODTU4.ts is allowed for input/output of various HO-ODUj signals, it is necessary for realization thereof to provide an accommodation circuit for an asynchronous signal for time-division cross-connection before and after the cross-connection, and it is necessary for realization of time division to establish frame synchronization at a cross-connection unit. In addition, there is a demand for an advanced circuit implementation technology such as necessity for such a design as to establish synchronization between common frames having the same LO-ODUk signal at an accommodating unit of HO-ODUj of an exchange destination, or unification of interfaces for the cross-connection.

Aside from those problems with the signal exchange device, an optical transmission capacity per optical path has been increasing on a current optical network, and there are a few cases where a transmission capacity for HO-ODUj to be transmitted is not used up, with the result that unused ODTU areas are scattered. It is possible to attain a more efficient transmission capacity in the optical network by using those unused areas, but when the capacity of the optical path to be used for transmission is larger than the capacity of each of fragmented paths, those fragmented paths cannot be used. When a signal is divided into a plurality of paths, there is a problem of providing a method of absorbing skew that occurs among paths due to an asynchronous operation clock and a difference in transmission delay among the optical paths.

CITATION LIST

Patent Literature

[PTL 1] JP 2011-199548 A

Non Patent Literature

[NPL 1] ITU-T, Recommendation G.707, January 2007
[NPL 2] ITU-T, Recommendation G.709, December 2009

SUMMARY OF INVENTION

Technical Problem

In view of such a situation as described above, it is desired to, for example, provide an optical communication cross-connection device and the like for easily realizing asynchronous signal exchange in units of LO-ODU irrespective of a clock speed or a type (speed) of an optical transmission interface while compensating intra-device skew.

An object of the present invention is to provide an optical communication cross-connection device and the like for easily realizing asynchronous signal exchange in units of LO-ODU irrespective of a clock speed or a type (speed) of an optical transmission interface while compensating intra-device skew.

Solution to Problem

According to one embodiment of the present invention, there are provided an optical communication cross-connection device and the like for exchanging an OTN signal through optical communications, including: a plurality of OTN signal processing units for asynchronously conducting OTN signal processing; and a space switch connected between the plurality of OTN signal processing units, for conducting bidirectional signal exchange for the OTN signal, in which a first OTN signal processing unit and a second OTN signal processing unit that conduct signal transmission among the plurality of OTN signal processing units subject the OTN signal to skew processing on one side and deskew processing corresponding to the skew processing on another side between the first OTN signal processing unit and the second OTN signal processing unit or between a communicating end-side one of the first OTN signal processing unit and the second OTN signal processing unit and a communicating end-side OTN signal processing unit of an optical communication cross-connection device of a communication counterpart destination with respect to the optical communication cross-connection device, and share a clock for the signal transmission therebetween.

Advantageous Effects of Invention

According to the one embodiment of the present invention, it is possible to easily realize the asynchronous signal exchange in units of the LO-ODU irrespective of the clock speed or the type (speed) of the optical transmission interface while compensating the intra-device skew.

BRIEF DESCRIPTION OF DRAWINGS

FIGS. 2A and 2B are diagrams for illustrating skew processing conducted by a transmission MLD unit or the like according to the present invention.

DESCRIPTION OF EMBODIMENTS

The present invention is to provide a configuration of a device for realizing circuit switching in units of LO-ODUk, the configuration being capable of simply and inexpensively realizing a solution to asynchronism due to intra-device skew, a difference in rate depending on each ODUj type, and a difference in clock at a time of accommodation and a solution to a difference in interface for exchanging ODUj. Further, the present invention is to provide a configuration for transmitting client signals distributed to a plurality of optical paths irrespective of a clock speed, a format (type) of the optical transmission interface, or a speed regardless of the clock speed or a type (speed) of an optical transmission interface while coping with skew within an optical path including line signal processing.

According to the present invention, an optical communication cross-connection device for exchanging the OTN signal through optical communications includes a client signal accommodating unit, a space switch for exchanging the signal, and a line signal processing unit, and is configured to use asynchronous accommodation as client signal accommodation and line signal accommodation and configured to be provided with MLD units as interfaces of the client signal accommodating unit and the line signal processing unit, which can compensate the intra-device skew and easily realize asynchronous signal exchange in units of LO-ODU irrespective of the clock speed or the type (speed) of the optical transmission interface.

Now, an optical communication cross-connection device and the like according to each of embodiments of the present invention are described with reference to the drawings. Note that, in each of the embodiments, the same or corresponding portions are denoted by the same reference symbols, and the overlapping description thereof is omitted.

First Embodiment

Figure 1:
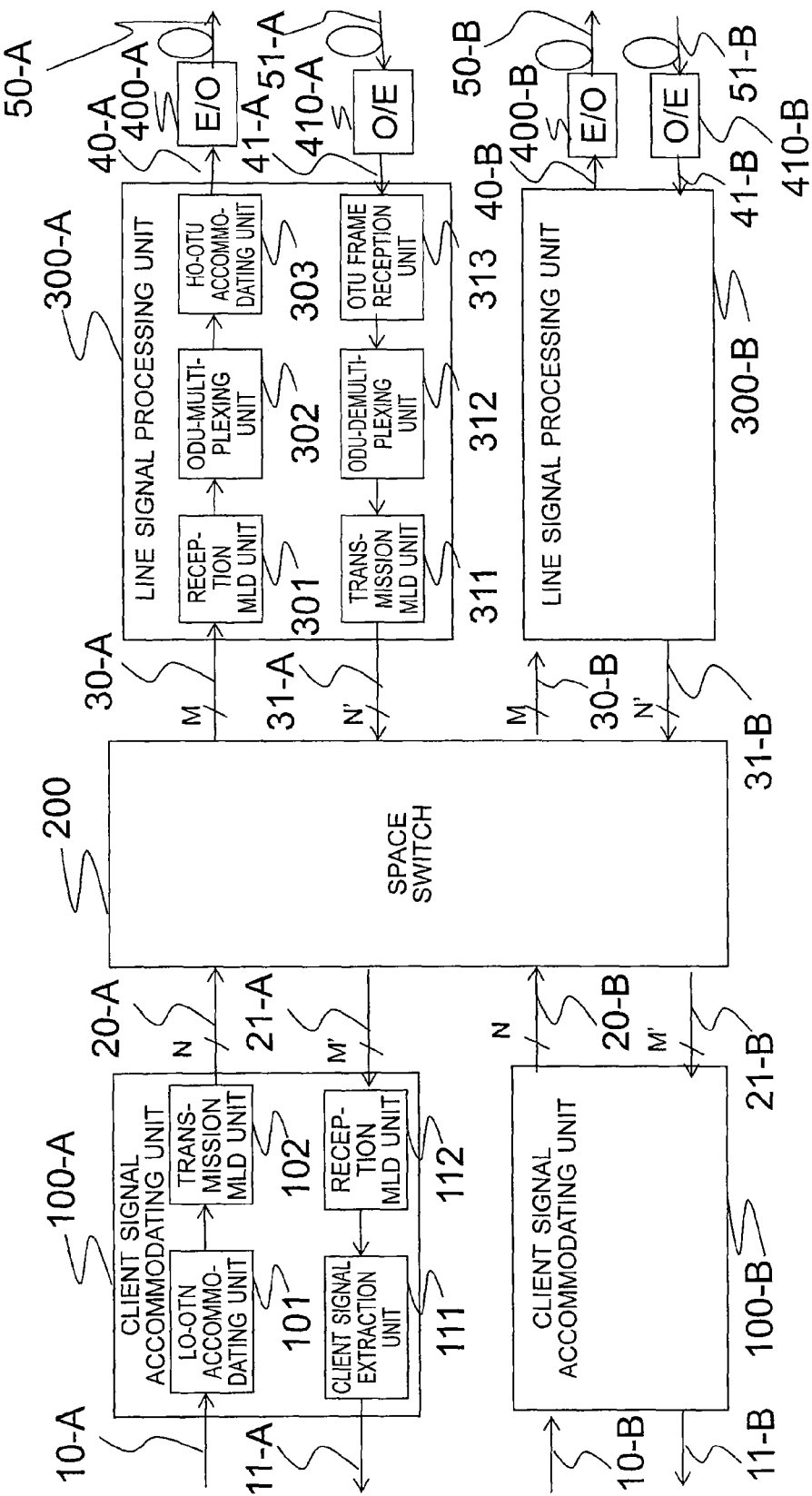
FIG. 1 is a diagram for illustrating a configuration of an optical communication cross-connection device according to a first embodiment of the present invention.

FIG. 1 is a diagram for illustrating a configuration of an optical communication cross-connection device according to a first embodiment of the present invention. In the optical communication cross-connection device illustrated in FIG. 1, a plurality of client signal accommodating units 100-A and 100-B each having the same configuration respectively accommodate client signals (groups) 10-A and 10-B, each of which is a signal having an arbitrary format and obtained by converting an electrical signal or an optical signal received from a communication device into an electrical signal, in LO-ODU signals, and output the LO-ODU signals as N parallel signals (N is an integer equal to or larger than 1) 20-A and 20-B. Further, the client signal accommodating units 100-A and 100-B respectively extract client signals from M' parallel signals (M' is an integer equal to or larger than 1) 21-A and 21-B received from a space switch 200, and output the client signals as the client signals (groups) 11-A and 11-B.

In the same manner, a plurality of line signal processing units 300-A and 300-B each having the same configuration respectively ODU-multiplex M parallel signals (M is an integer equal to or larger than 1) 30-A and 30-B that are input thereto, and output the M parallel signals 30-A and 30-B as electrical signals 40-A and 40-B serving as HO-OTU signals. Further, the line signal processing units 300-A and 300-B respectively ODU-demultiplex electrical signals 41-A and 41-B that are input thereto, and output the electrical signals 41-A and 41-B as N' parallel signals (N' is an integer equal to or larger than 1) 31-A and 31-B.

The space switch 200 having a distribution function as a switch unit outputs the respective signals within the N-parallel-signal groups 20-A and 20-B received from the client signal accommodating units 100-A and 100-B, after switching routes thereof, to the line signal processing units 300-A and 300-B as the M parallel signals 30-A and 30-B, and outputs the respective signals within the N'-parallel-signal groups 31-A and 31-B received from the line signal processing units 300-A and 300-B, after switching routes thereof, to the client signal accommodating units 100-A and 100-B as the M' parallel signals 21-A and 21-B.

A plurality of electrical/optical signal converters (E/O) 400-A and 400-B respectively conduct electrical/optical conversion for the electrical signals 40-A and 40-B received from the line signal processing units 300-A and 300-B, and send out the electrical signals 40-A and 40-B as optical signals 50-A and 50-B. Further, a plurality of optical/electrical signal converters (O/E) 410-A and 410-B respectively conduct optical/electrical conversion for optical signals 51-A and 51-B received from another node (not shown) on an optical communication network when the optical communication cross-connection device illustrated in FIG. 1 is assumed as one node, and send out the optical signals 51-A and 51-B as the electrical signals 41-A and 41-B.

Note that, in this embodiment, the numbers of client signal accommodating units, line signal processing units, electrical/optical signal converters, and optical/electrical signal converters are described as two for illustration of the signal groups to be connected thereto, but the present invention is not limited thereto, and each of the numbers may be at least 1.

First, a description is made of an operation conducted in a case of accommodating a client signal and sending out the client signal to an optical transmission line. In the client signal accommodating unit (100), an LO-OTN accommodating unit (OTN (LO)) 101 accommodates the client signal (10) that is input thereto in the LO-ODU signal described in the ITU-T G.709 recommendation by using the asynchronous accommodation based on an asynchronous mapping procedure (AMP), a bit mapping procedure (BMP), or a generic mapping procedure (GMP), and outputs the LO-ODU signal to a transmission MLD unit 102 as an OTUk signal or an ODUk signal. The transmission MLD unit (EG-MLD) 102 converts a signal that is input as necessary into the N parallel signals (20) (set as "MLD signals" or "first MLD signals") subjected to skew processing by multi-lane distribution (MLD), and then outputs the N parallel signals (20) to the space switch 200. N is an integer equal to or larger than 1, but parallelization is not conducted when N is 1. Therefore, when N is 1, implementation of the transmission MLD unit 102 can be omitted, and even when the transmission MLD unit 102 is implemented, the transmission MLD unit 102 can also be inhibited from conducting processing.

As an example of this embodiment, when an STM-256 signal (40 Gbps) is accommodated as the client signal (10), the LO-OTN accommodating unit 101 can be configured to, for example, accommodate the client signal in an ODU3 signal, and the transmission MLD unit 102 can be configured to subject the ODU3 signal converted into an OTU3 frame or the ODU3 signal remaining in a state of an ODU3 frame to the skew processing such as frame-alignment signal (FAS) signal processing using OTL (Optical Channel Transport Lane) 3.4 described in G.709 illustrated in FIGS. 2A and 2B, and then output the ODU3 signal to the space switch 200 as four parallel signals. FIG. 2A and FIG. 2B are illustrations for the skew processing based on the FAS signal processing using OTL3.4 relating to OTU3 and ODU3, respectively.

The space switch 200 receives the N parallel signals 20-A and 20-B, which correspond to signals having a total number of 2×N, from the plurality of client signal accommodating units 100-A and 100-B, and outputs each of the parallel signals to the line signal processing unit 300-A or 300-B corresponding to a suitable route depending on its purpose as the M parallel signals 30-A or 30-B serving as a signal group.

A reception MLD unit (ING-MLD) 301 uses a skew processing signal used for skew processing signal processing to conduct deskew processing for the N parallel signals (20) subjected to the skew processing signal processing by the transmission MLD unit 102 among the M parallel signals (30) exchanged by the space switch 200 and input to the line signal processing unit (300), and recovers the LO-ODUk signal therefrom. Note that, the parallelization is not conducted when N is 1, and hence the reception MLD unit 301 can be omitted. The recovered LO-ODUk signal is input to an ODU-multiplexing unit (ODUMUX) 302.

Figure 3:
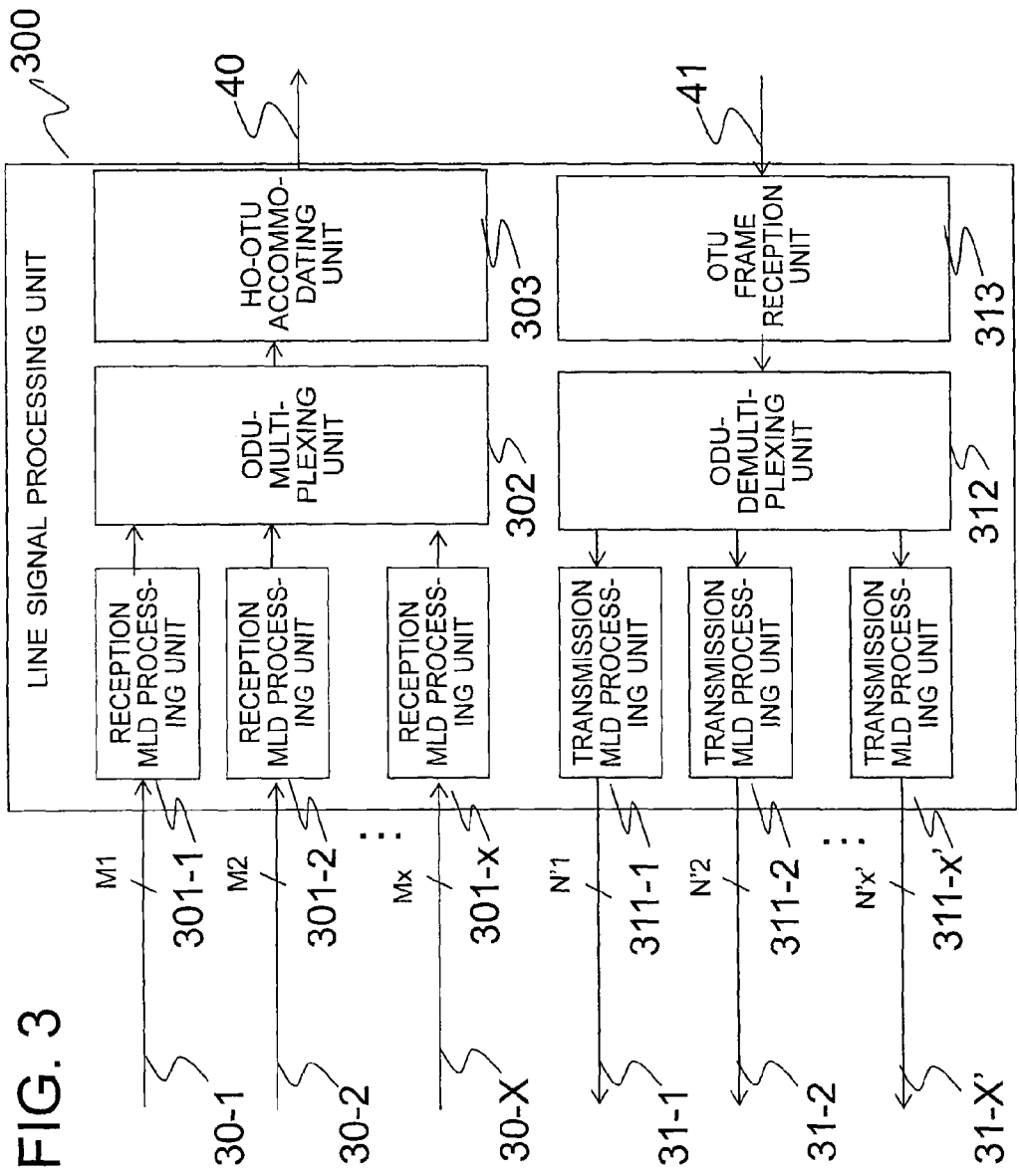
FIG. 3 is a diagram for illustrating an example of a detailed configuration of a line signal processing unit according to the first embodiment of the present invention.

FIG. 3 is an illustration for details of the line signal processing unit (300). The M parallel signals (30), which are M signals to be input, are formed of parallel signals having x channels (x is an integer equal to or larger than 1). The respective channels are provided with reception MLD processing units 301-1, 301-2, . . . , and 301-x corresponding to the mutually different client signal accommodating units (100-A, 100-B, . . . ), and the reception MLD processing units 301-1, 301-2, . . . , and 301-x receive the M1, M2, . . . , Mx parallel signals (30-1, 30-2, . . . , and 30-x), respectively, which have been exchanged and output by the space switch 200. The N parallel signals 20-A output from the client signal accommodating unit 100-A are allocated to any one of the parallel signals 30-1, 30-2, . . . , and 30-x, and the signals output from the different client signal accommodating unit (100) are allocated to another channel. A number Mn of parallel signals that can be received through the channel 30-n is equal to or larger than a number Nn of parallel signals output from the corresponding client signal accommodating unit (100). The LO-ODUk signal recovered by the respective reception MLD processing units 301-1, 301-2, . . . , and 301-x is input to the ODU-multiplexing unit 302. The ODU-multiplexing unit 302 asynchronously accommodates the input LO-ODUk signal in the HO-ODUj signal (j≥k) by using GMP or the like described in the ITU-T G.709 recommendation.

When j=k and when the clock of LO-ODUk and the clock of HO-ODUj are set to be the same, the ODU-multiplexing unit 302 can also be omitted.

When j=k and when the clock of LO-ODUk and the clock of HO-ODUj are not the same, an asynchronous transfer of the OPUk signal is conducted.

The HO-ODUj signal is converted into an OTUj frame by an HO-OTU accommodating unit (OTU (HO)) 303, sent out to the electrical/optical signal converter (E/O) (400), and transmitted to a counter node as the optical signal (50) through an optical fiber. In this case, the optical signals 50-A and 50-B sent out from the different line signal processing units 300-A and 300-B through the electrical/optical signal converters 400-A and 400-B have different wavelengths, or are sent out to different routes.

Next, a description is made of an operation conducted when a line signal corresponding to the optical signal (51) is received and the client signal (11) is sent out. The line signal processing unit (300) receives the optical signal (51) from another node as the electrical signal (41) through the optical/electrical signal converter (O/E) 410. An OTU frame reception unit (De-OTU (OH)) 313 extracts the HO-ODUj signal from an HO-OTUj frame constructed on a transmission side, and an ODU-demultiplexing unit (ODUDMUX) 312 demultiplexes the LO-ODUk signal from the HO-ODUj signal. In regard to the demultiplexed LO-ODUk signal, a transmission MLD unit (EG-MLD) 311 converts a signal that is input as necessary into the N' parallel signals (31) (set as "MLD signals" or "second MLD signals") subjected to the skew processing by MLD, and then outputs the N' parallel signals (31) to the space switch 200.

Note that, as illustrated in FIG. 3, the transmission MLD unit 311 outputs the LO-ODUk signal demultiplexed by the ODU-demultiplexing unit 312 to the space switch 200 as N'1, N'2, . . . , and N'x' parallel signals (31-1, 31-2, . . . , and 31-x') at corresponding transmission MLD processing units 311-1, 311-2, . . . , and 311-x'. Synchronization is not necessarily established among the parallel signals 31-1, 31-2, . . . , and 31-x'.

In other words, the ODU-demultiplexing unit 312 demultiplexes the LO-ODUk signal as signals having x' channels (x' is an integer equal to or larger than 1), and the N' parallel signals (31), which are N' signals to be output from the transmission MLD unit 311, are formed of the parallel signals having x' channels. The respective channels are provided with the transmission MLD processing units 311-1, 311-2, . . . , and 311-x' corresponding to the mutually different client signal accommodating units (100-A, 100-B, . . . ), and the transmission MLD processing units 311-1, 311-2, . . . , and 311-x' conduct skew processing for the signals of the channels respectively corresponding to the signals demultiplexed by the ODU-demultiplexing unit 312, and transmits the parallel signals (31-1, 31-2, . . . , and 31-x') to the space switch 200.

The space switch 200 receives the N' parallel signals 31-A and 31-B, which correspond to signals having a total number of 2×N', from the plurality of line signal processing units 300-A and 300-B, and outputs each of the parallel signals to the client signal accommodating unit 100-A or 100-B corresponding to a suitable route depending on its purpose as the M' parallel signals 21-A and 21-B. Therefore, the parallel signals 31-1, 31-2, . . . , and 31-x' output from the line signal processing unit 300 are respectively allocated to the M' parallel signals (21) serving as inputs to any one of the client signal accommodating units (100). A number M'n of parallel signals that can be received by the client signal accommodating unit 100 is equal to or larger than a number N'n of parallel signals output from the corresponding channel 31-n.

A reception MLD unit (ING-MLD) 112 uses a skew processing signal used for skew processing signal processing to conduct the deskew processing for the N' parallel signals subjected to the skew processing signal processing by the transmission MLD unit 311 among the M' parallel signals (21) exchanged by the space switch 200 and input to the client signal accommodating unit (100), and recovers the LO-ODUk signal therefrom. A client signal extraction unit (De-OTU (LO)) 111 extracts the client signal from the recovered LO-ODUk signal, and outputs the client signal as the client signal 11.

In this case, the optical signals 51-A and 51-B, which are received optical signals, are received from different nodes, and hence the speeds of the N' parallel signals (data) 31-A and 31-B input to the space switch 200 are generally asynchronous. It is possible for the reception MLD unit to recover the signal in accordance with the speed of received data through the transmission of a clock from the transmission MLD unit 311 to the reception MLD unit 112 serving as a transmission destination or through the provision of a clock data recovery (CDR) function to the reception MLD unit 112.

The same applies between the transmission MLD unit 102 and the reception MLD unit 301, and it is possible for the reception MLD unit to recover the signal in accordance with the speed of received data through the transmission of a clock from the transmission MLD unit 102 to the reception MLD unit 301 serving as a transmission destination or through the provision of the clock data recovery (CDR) function to the reception MLD unit 301.

The space switch 200 has the function of simply switching a signal path, and conducts no clock operation. Accordingly, the signal passing through an inside thereof does not need the synchronization for a specific system clock, and hence an interface between the transmission MLD unit 102, 311 and the reception MLD unit 301, 112 is not limited to any particular type or speed. For example, the space switch 200 normally operates even in a state in which an OTL4.10 signal (11.3 Gbps), an OTU2 signal (10.7 Gbps), and an SFI (serdes framer interface) 5.1 signal (2.6 Gbps) are input/output to the space switch, and each of the signals is free from data loss due to inconsistent clock. Further, at a time of ODU accommodation, the accommodation and extraction can be conducted in accordance with any clock as long as specifications defined in the G.709 recommendation are satisfied, which does not necessitate a common clock for centrally controlling an entire system including the client signal accommodating unit and the line signal processing unit.

In this manner, conducting asynchronous signal communications irrespective of the clock speed and the type (processing speed) of the optical transmission interface is possible while compensating the intra-device skew by using the space switch as well as providing the MLD processing function including the skew compensation to the client signal accommodating unit and the line signal processing unit and also providing an ODU asynchronous accommodation function in HO/LO to the line signal processing unit. Further, the space switch 200 may be a simple signal switching switch, which realizes a simple and inexpensive device configuration.

The space switch 200 can improve a switch capacity by using different space switches between the transmission side (from 102 to 301) and the reception side (from 311 to 112), or can reduce the number of parts by using the same space switch. In the latter case, in the space switch 200, by connecting a part or all of the outputs 31-A from the line signal processing unit 300-A to the inputs 30-B to another line signal processing unit (300-B) or connecting a part or all of the outputs 20-A from the client signal accommodating unit 100-A to the inputs 21-B to another client signal accommodating unit, it is possible to realize a cross-connection function for the LO-ODUk signal between the line signals or between the client signals. In other words, the signal transmission between the line signal processing units (300-A and 300-B) and between the client signal accommodating units (100-A and 100-B) can also be conducted via the space switch 200 in the same manner.

Further, the space switch is described above to have one side connected to the client signal accommodating unit for conducting conversion processing between the client signals having various formats and the OTU (OTN) signal and the other side connected to the line signal processing unit for converting an OTU signal between LO-ODU and HO-ODU, but may have both the sides connected to the client signal accommodating unit or have both the sides connected to the line signal processing unit. In other words, the same effects are produced in the signal transmission between OTN signal processing units in a structure in which a plurality of the OTN signal processing units (100 and 300) formed of the client signal accommodating unit or the line signal processing unit are connected to the space switch.

Figure 4:
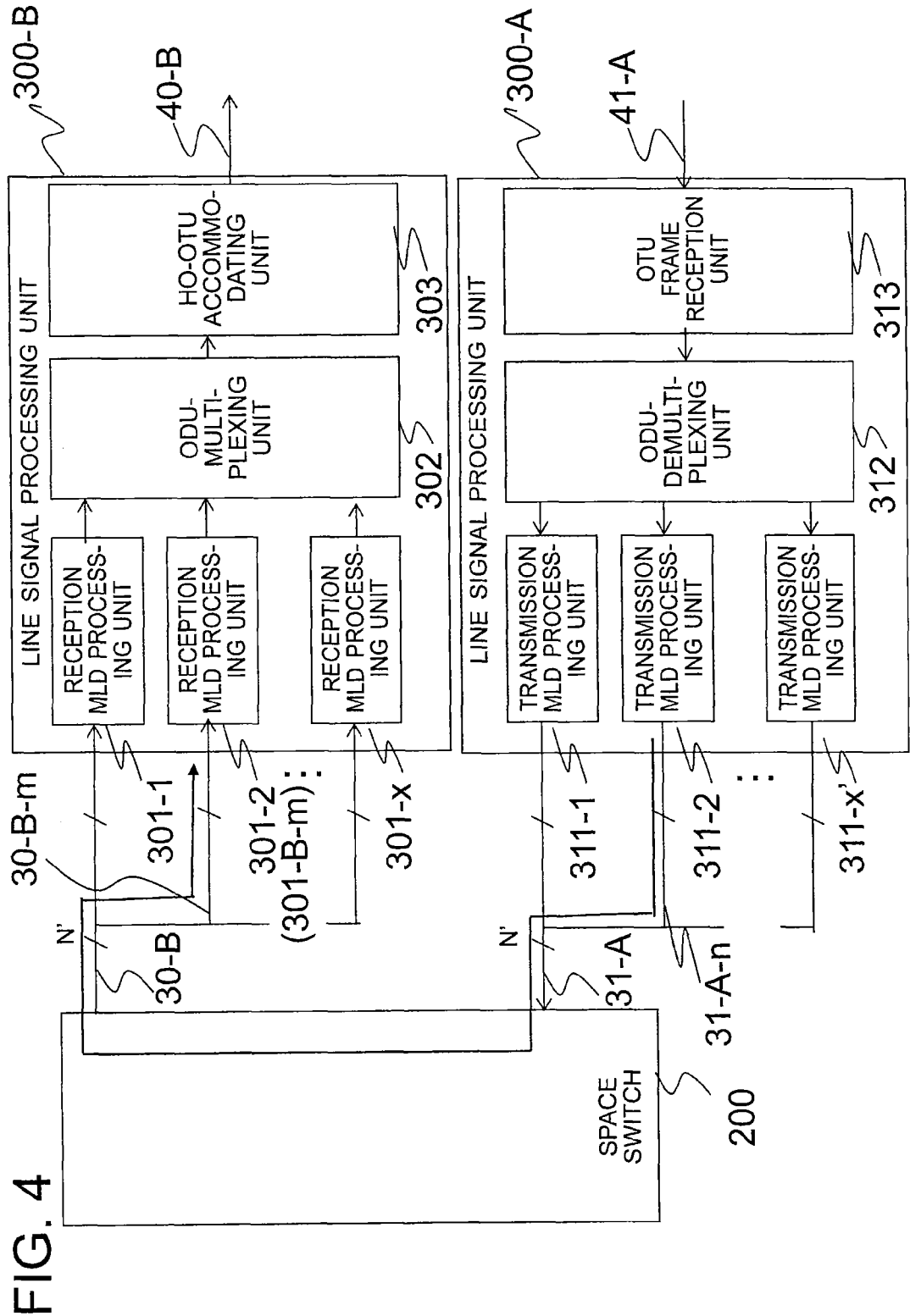
FIG. 4 is a diagram for illustrating an operation of the optical communication cross-connection device according to the first embodiment of the present invention.

A description is made of an operation conducted when the signal transmission is conducted between the line signal processing units (300) (300-A and 300-B). FIG. 4 is a diagram for illustrating the operation. A state of transmission from the line signal processing unit 300-A to the line signal processing unit 300-B is illustrated, and only the transmission side of the line signal processing unit 300-A and only the reception side of the line signal processing unit 300-B are illustrated. The line signal processing unit 300-A receives the optical signal (51-A) from another node as the electrical signal (41-A) through the optical/electrical signal converter (O/E) 410-A (see FIG. 1). The OTU frame reception unit (De-OTU (OH)) 313 extracts the HO-ODUj signal from the HO-OTUj frame constructed on the transmission side, and the ODU-demultiplexing unit (ODUDMUX) 312 demultiplexes the LO-ODUk signal from the HO-ODUj signal. In regard to the demultiplexed LO-ODUk signal, the transmission MLD unit (EG-MLD) 311 converts the signal that is input as necessary into the N' parallel signals 31-A (set as "MLD signals" or "second MLD signals") subjected to the skew processing by MLD, and then outputs the N' parallel signals 31-A to the space switch 200.

The space switch 200 outputs a parallel output signal 31-A-n, which is output from a channel A-n of the line signal processing unit 300-A to the space switch 200, as a parallel input signal 30-B-m to a channel B-m of the line signal processing unit 300-B. The N' parallel signals 31-A input to the channel B-m of the line signal processing unit 300-B are recovered as the LO-ODUk signal by the reception MLD processing unit 301-B-m (301-2) of the line signal processing unit 300-B, and asynchronously accommodated in the HO-ODUj signal by the ODU-multiplexing unit 302 along with the signal input to another channel of the line signal processing unit 300-B (j≥k). HO-ODUj is converted into the OTUj frame by the HO-OTU accommodating unit (OTU (HO)) 303, sent out to the electrical/optical signal converter (E/O) 400-B (see FIG. 1), and transmitted to the counter node as the optical signal 50-B through the optical fiber.

A description is made of an operation conducted when the signal transmission is conducted between the client signal accommodating units (100) (100-A and 100-B). In the client signal accommodating unit 100-A, the LO-OTN accommodating unit (OTN (LO)) 101 accommodates the client signal 10-A that is input thereto in the LO-ODU signal described in the ITU-T G.709 recommendation by using the asynchronous accommodation, and outputs the LO-ODU signal to the transmission MLD unit 102 as the OTUk signal or the ODUk signal. The transmission MLD unit 102 converts the signal that is input as necessary into the N parallel signals 20-A subjected to skew processing by MLD, and then outputs the N parallel signals 20-A to the space switch 200. The space switch 200 outputs a parallel output signal 20-A, which is output from the client signal accommodating unit 100-A to the space switch 200, as a parallel input signal 21-B to the client signal accommodating unit 100-B. The parallel signals 21-B input to the client signal accommodating unit 100-B are recovered as the LO-ODUk signal after being subjected to the deskew processing by use of the skew processing signal by the reception MLD unit 112. The client signal extraction unit (De-OTU (LO)) 111 extracts the client signal from the recovered LO-ODUk signal, and outputs the client signal as a client signal 11-B.

Note that, at a time of the signal transmission between the line signal processing units (300) (300-A and 300-B), a clock for signal transmission is shared between the transmission MLD unit 311 of the line signal processing unit 300-A and the reception MLD unit 301 of the line signal processing unit 300-B and between the transmission MLD unit 311 of the line signal processing unit 300-B and the reception MLD unit 301 of the line signal processing unit 300-A. Further, similarly at a time of the signal transmission between the client signal accommodating units (100) (100-A and 100-B), the clock for the signal transmission is shared between the reception MLD unit 112 and the transmission MLD unit 102 for conducting the signal transmission.

Second Embodiment

Figure 5:
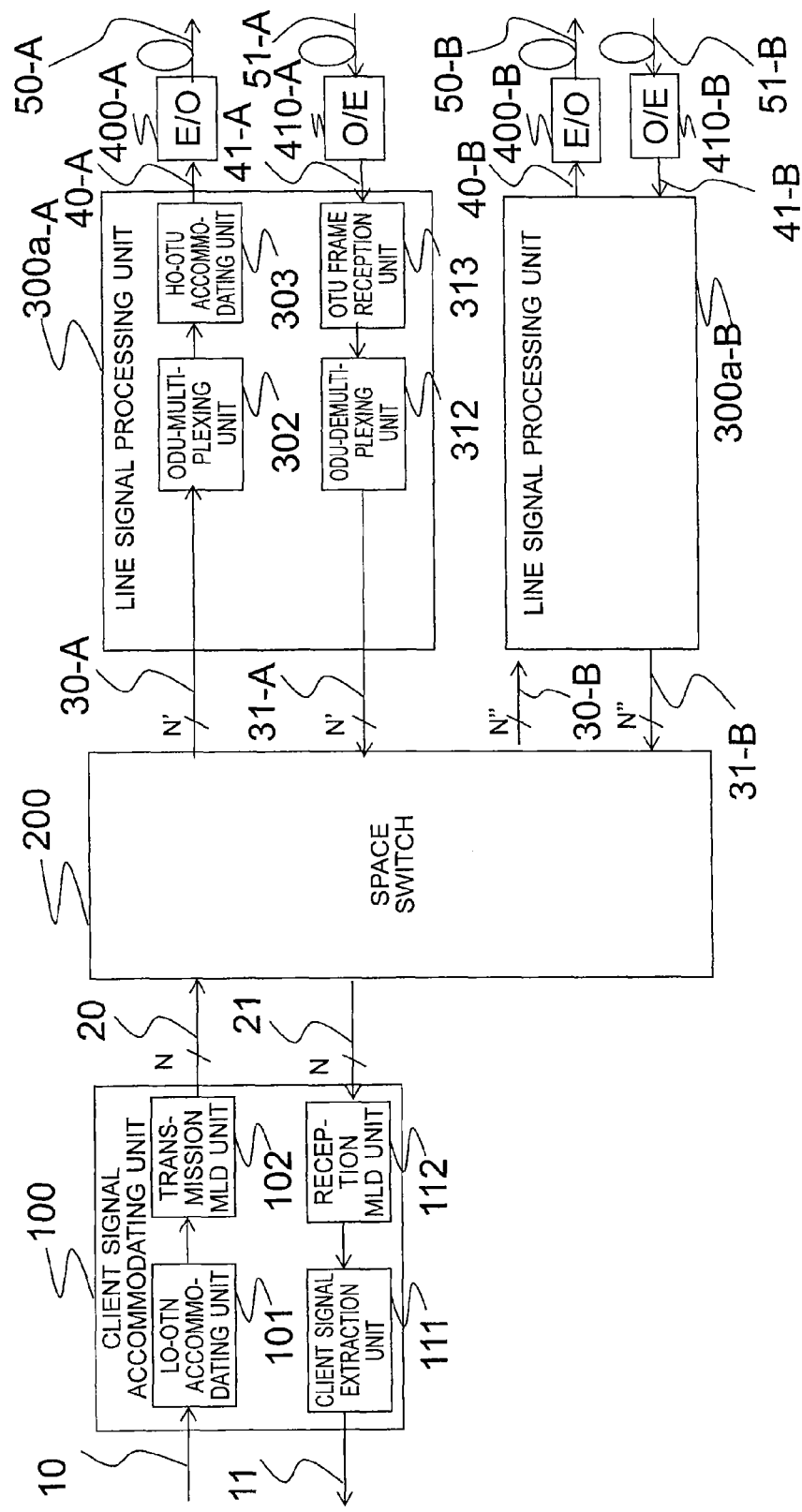
FIG. 5 is a diagram for illustrating a configuration of an optical communication cross-connection device according to a second embodiment of the present invention.

FIG. 5 is a diagram for illustrating a configuration of an optical communication cross-connection device according to a second embodiment of the present invention. In the optical communication cross-connection device illustrated in FIG. 5, the client signal accommodating unit 100 accommodates the client signal 10 in LO-ODU signals, and output the LO-ODU signals as N parallel signals (N is an integer equal to or larger than 2) 20. Further, the client signal accommodating unit 100 extracts client signal from N parallel signals 21 received from the space switch 200, and outputs the client signal as the client signal 11.

A plurality of line signal processing units 300a-A and 300a-B respectively ODU-multiplex N' parallel fragmented signals 30-A and N" parallel fragmented signals 30-B (N=N'+N") that are input thereto, and output the parallel fragmented signals 30-A and 30-B as HO-OTU signals. Further, the line signal processing units 300a-A and 300a-B respectively ODU-demultiplex electrical signals 41-A and 41-B that are input thereto, and output the electrical signals 41-A and 41-B as N' parallel signals 31-A and N" parallel signals 31-B.

The space switch 200 as a switch unit outputs the respective signals within the N parallel signals 20 received from the client signal accommodating unit 100, after switching routes thereof, to the line signal processing units 300a-A and 300a-B as the N' parallel fragmented signals 30-A and N" parallel fragmented signals 30-B, and outputs the respective signals within the N' parallel signals 31-A and N" parallel signals 31-B received from the line signal processing units 300a-A and 300a-B, after switching routes thereof, to the client signal accommodating unit 100 as the N parallel signals 21.

The plurality of electrical/optical signal converters (E/O) 400-A and 400-B respectively conduct electrical/optical conversion for the electrical signals 40-A and 40-B received from the line signal processing units 300a-A and 300a-B, and send out the electrical signals 40-A and 40-B as optical signals 50-A and 50-B. Further, the plurality of optical/electrical signal converters (O/E) 410-A and 410-B respectively conduct optical/electrical conversion for optical signals 51-A and 51-B received from another node (not shown) and send out the optical signals 51-A and 51-B as the electrical signals 41-A and 41-B.

Note that, in this embodiment, the number of client signal accommodating units is one, and the numbers of line signal processing units, electrical/optical signal converters, and optical/electrical signal converters are described as two for illustration of the signal groups to be transmitted thereto, but the present invention is not limited thereto as in the first embodiment.

In the first embodiment, the skew processing and the deskew processing corresponding to the skew processing are conducted between the client signal accommodating unit (100) and the line signal processing unit (300) on both the sides of the space switch 200. In this embodiment, the skew processing is not conducted on the line signal processing unit (300) side, and the skew processing and the deskew processing corresponding to the skew processing are conducted between an output from the client signal accommodating unit (100) having a configuration illustrated in FIG. 5 and serving as, for example, a node on the transmission side, and an input to the client signal accommodating unit (100) having the same configuration and serving as another node on the reception side of the communication counterpart (for example, upstream and downstream).

Figure 6:
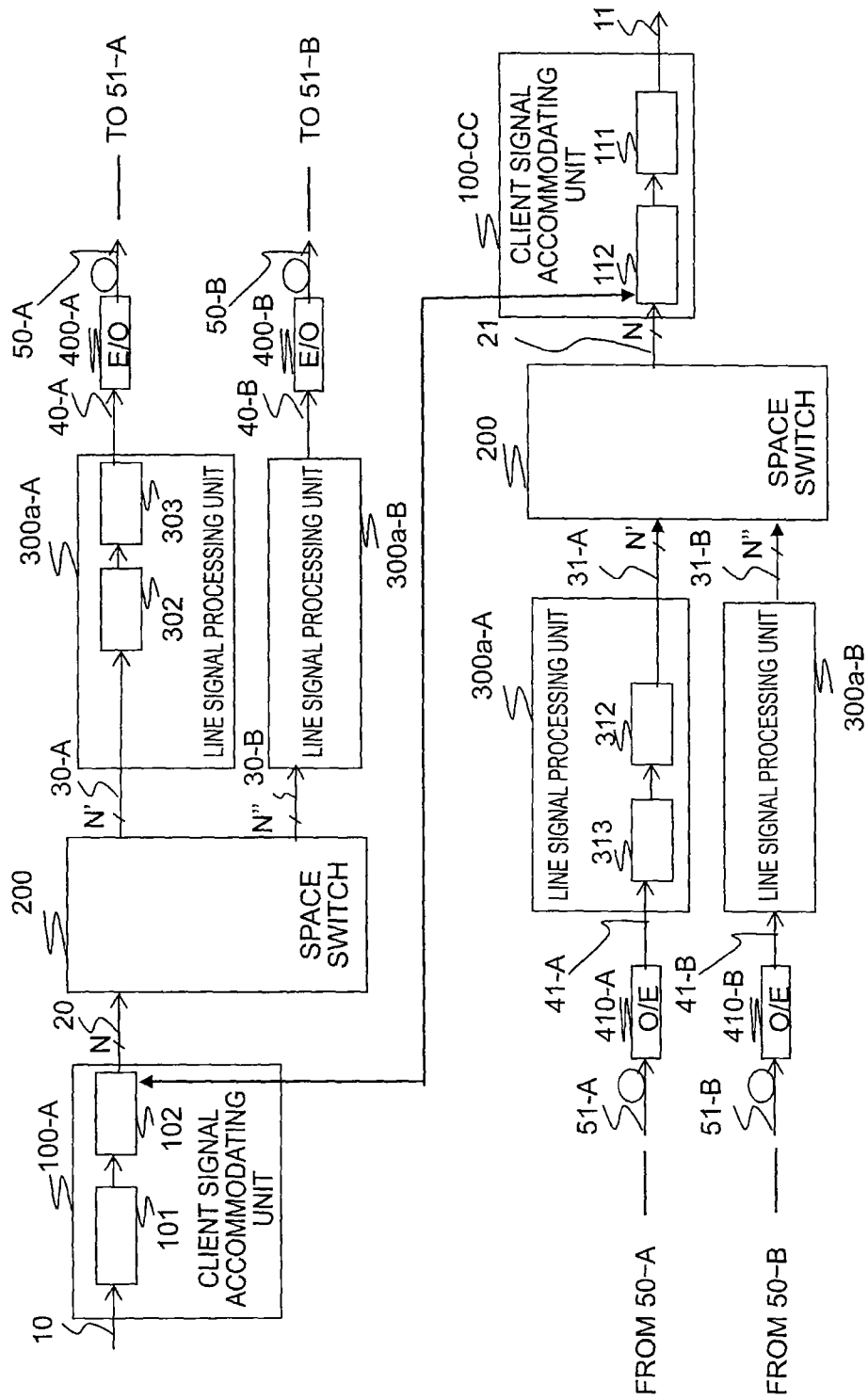
FIG. 6 is a diagram for illustrating an operation conducted in a state in which two optical communication cross-connection devices according to the second embodiment of the present invention are communicably connected to each other.

FIG. 6 is a diagram for illustrating an operation conducted in a state in which two optical communication cross-connection devices each forming the communication node as described above are communicably connected to each other. In the state illustrated in FIG. 6, the optical communication cross-connection devices on the upper side and on the lower side each have the configuration illustrated in FIG. 5, the optical communication cross-connection device on the upper side is a transmission-side node, and the optical communication cross-connection device on the lower side is a reception-side node. Parts irrelevant to the operation are omitted from the illustration. Then, the skew processing, the deskew processing corresponding to the skew processing, and the sharing of the clock are conducted between the transmission MLD unit 102 of the client signal accommodating unit 100-A of the transmission-side node on the upper side and the reception MLD unit 112 of a client signal accommodating unit 100-CC of the reception-side node on the lower side.

Further, in this embodiment, the plurality of client signal accommodating units (100-A, 100-B, . . . ) may be provided as in the first embodiment described with reference to FIG. 1, and the description is made below by presupposing the configuration in which the plurality of client signal accommodating units are connected.

First, a description is made of an operation conducted in a case of accommodating a client signal and sending out the client signal to an optical transmission line. As in the first embodiment, in the client signal accommodating unit 100, the LO-OTN accommodating unit 101 accommodates the client signal 10 that is input thereto in the LO-ODU signal, and outputs the LO-ODU signal to the transmission MLD unit 102 as an ODUk signal. The transmission MLD unit 102 converts the ODUk signal that is input into the N parallel signals 20 (set as "MLD signals" or "first MLD signals") subjected to skew processing, and then outputs the N parallel signals 20 to the space switch 200.

The space switch 200 receives the N parallel signals 20, which correspond to N signals, from the client signal accommodating unit 100, and outputs the N signals of the N parallel signals 20 by distributing the N' parallel fragmented signals 30-A to the line signal processing unit 300a-A and N" parallel fragmented signals 30-B to the line signal processing unit 300a-B (N=N'+N").

The N' parallel fragmented signals 30-A distributed by the space switch 200 and input to the line signal processing unit 300a-A are input to an ODU-multiplexing unit 302-A, and directly asynchronously mapped to an ODTU tributary slot area of HO-ODUj by ODUflex or the like described in ITU-T G.709.

Figure 7:
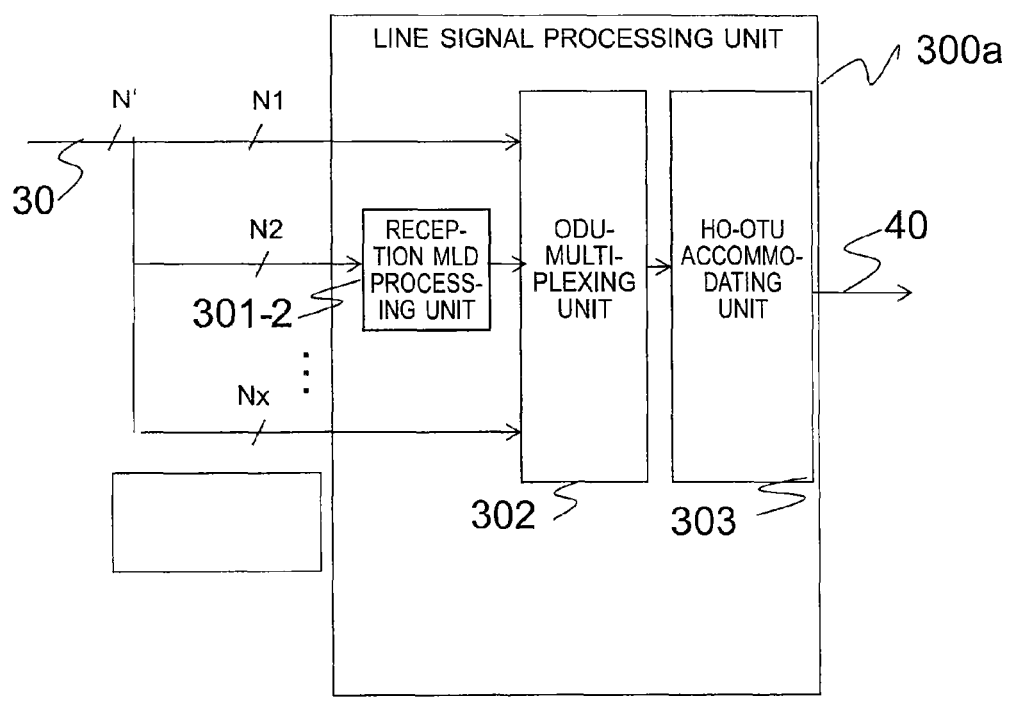
FIG. 7 is a diagram for illustrating an example of a detailed configuration of a line signal processing unit according to the second embodiment of the present invention on a signal processing side from the client to an optical communication system.

FIG. 7 is a diagram for illustrating details of a signal processing side of the signal from the client to the optical communication network of the line signal processing unit (300a) according to this embodiment. The reception MLD processing unit 301-2 indicated by the broken line indicates a case where a reception MLD processing unit is provided to a part of the distributed parallel signals (for example, N2 parallel signals) when the reception MLD unit 301 is provided as in the first embodiment described with reference to FIG. 1.

Note that, on the signal processing side from the optical communication network to the client side, the OTU frame reception unit 313 and the ODU-demultiplexing unit 312 are provided along with the transmission MLD processing units (311) for a part of the parallel signals demultiplexed by the ODU-demultiplexing unit 312.

Also in this embodiment, the line signal processing unit (300a) has a function of receiving the LO-ODUk signal from a different client signal accommodating unit as MLD, and the direct mapping of the parallel fragmented signals and a function of multiplexing LO-ODUj coexist by suitably distributing ODTUj.ts tributary slots.

Figure 8:
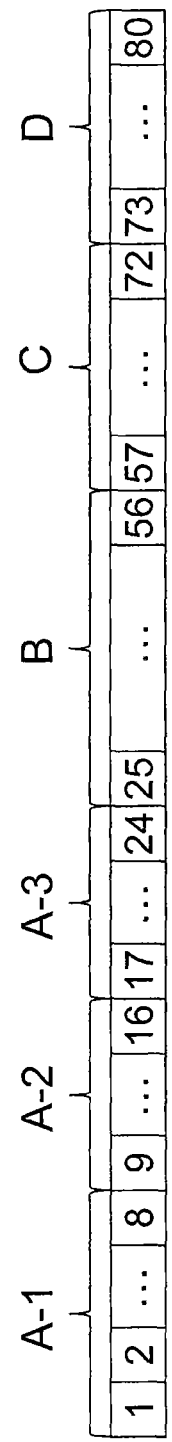
FIG. 8 is a diagram for illustrating an example of distributing ODTU areas by the line signal processing unit according to the second embodiment of the present invention.
Figure 9A:
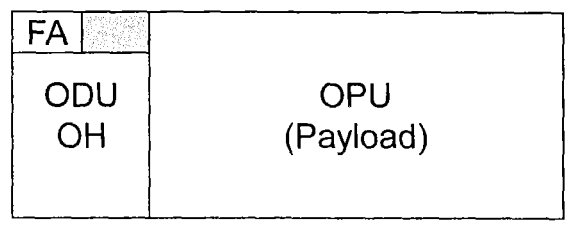
FIGS. 9A and 9B are diagrams for illustrating frame structures used in an OTN method.
Figure 9B:
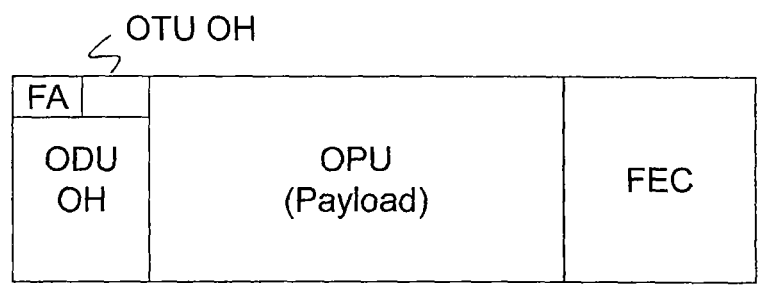
Figure 10:
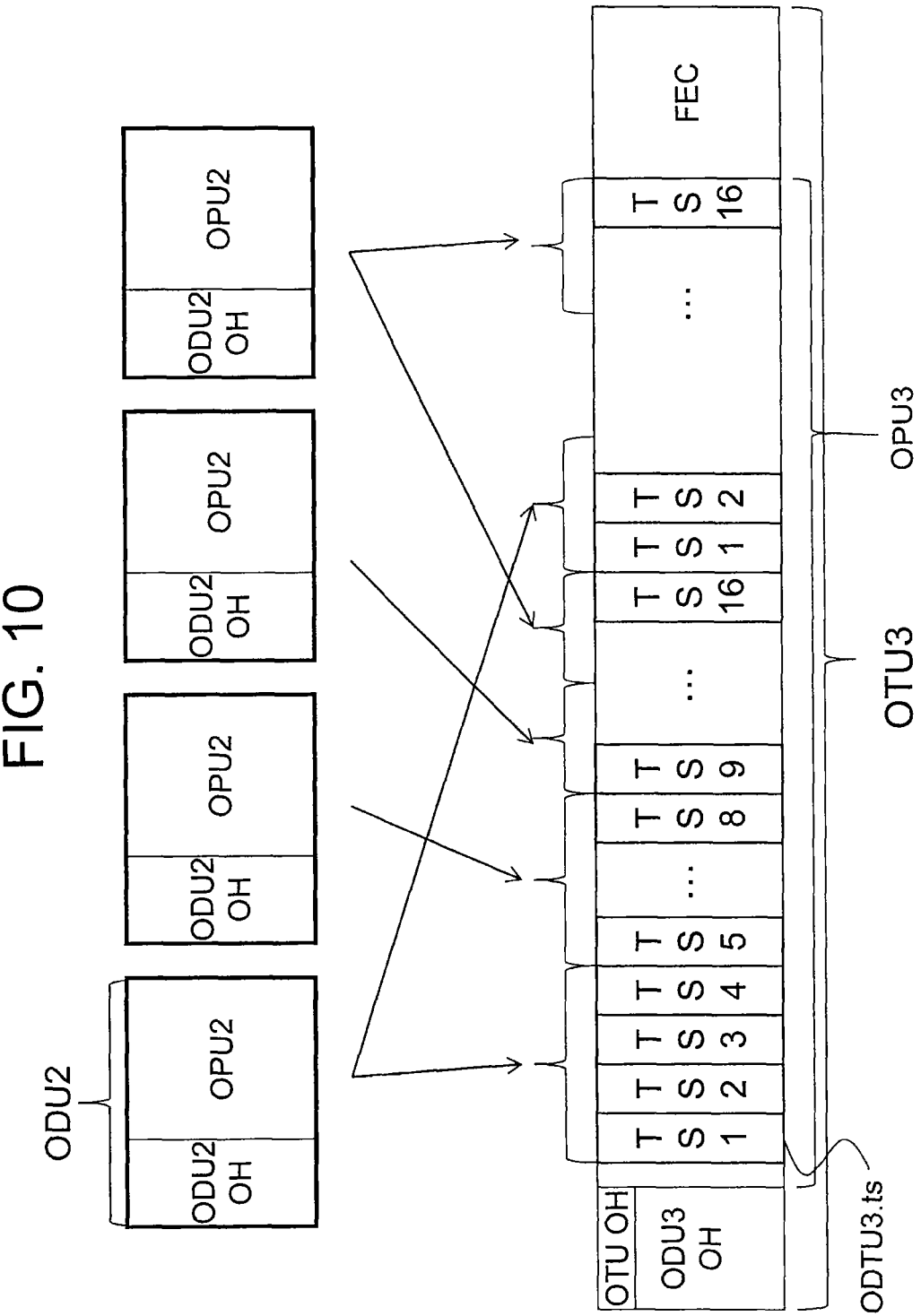
FIG. 10 is a diagram for illustrating a ladder structure for multiplex-accommodating transmission frames at lower-level speeds of a transmission frame.

FIG. 8 is a diagram for illustrating an example of distributing ODTU areas when the signals from a plurality of client signal accommodating units are accommodated according to this embodiment. In HO-OTU4 in which a total number of ODTU4.ts tributary slots is 80 at the line signal processing unit (300a), three signals among four OTL3.4 parallel signals from a client signal accommodating unit A are accommodated (corresponding to A-1 to A-3 in FIG. 8), LO-OTU3 signals from a client signal accommodating unit B are accommodated (B in FIG. 8), two signals among OTL3.4 parallel signals from a client signal accommodating unit C are accommodated (C in FIG. 8), and ODU2 signals from a client signal accommodating unit D are accommodated (D in FIG. 8).

When the ODU3 signal is transmitted by the four parallel signals of OTL3.4, the number of ODTU4.ts's necessary for one parallel signal is 8. Therefore, slots 1 to 24 are allocated to the client (A) for inputting three fragmented parallel signals. Further, the number of slots necessary to transmit LO-ODU3 is 32, and hence slots 25 to 56 are allocated to the signals from the client B.

Two signals among the four parallel signals of OTL3.4 are allocated to the client C, and hence slots 57 to 72 are allocated to sixteen slots that are necessary. The number of slots necessary to transmit LO-ODU2 is 8, and hence slots 73 to 80 are allocated to the client D.

In this manner, the line signal processing unit (300a) suitably distributes ODTUj.ts tributary slots, to thereby be able to cause the direct mapping of the parallel fragmented signals and the function of multiplexing LO-ODUj to coexist.

The ODU-multiplexing is thus conducted, and the HO-ODUj signal output from the ODU-multiplexing unit 302 is converted into the OTUj frame by the HO-OTU accommodating unit 303, sent out to the electrical/optical signal converter 400-A, and transmitted to the counter node on the optical communication network as the optical signal 50-A through the optical fiber. In this case, the optical signals 50-A and 50-B sent out from the different line signal processing units 300a-A and 300a-B through the electrical/optical signal converters 400-A and 400-B are sent out as different optical paths. In this case, the asynchronous mapping is conducted for the ODU-multiplexing, and hence HO-OTUj signals transmitted from between the line signal processing units 300a-A and 300-B may have different types as long as j≥k is satisfied.

Next, a description is made of an operation conducted when the line signal is received and the client signal is sent out. The reception node also has the configuration illustrated in FIG. 5 in the same manner as the transmission node. The optical signal 50-A transmitted from the transmission node through the optical transmission line in the above-mentioned manner is received by the line signal processing unit 300a-A as the optical signal 51-A in the reception node, and the optical signal 50-B transmitted from the transmission node through the optical transmission line is received by the line signal processing unit 300a-B as the optical signal 51-B in the reception node. The line signal processing unit (300a) receives the optical signal (51) from another node as the electrical signal 41 through the optical/electrical signal converter (410). The OTU frame reception unit 313 extracts the HO-ODUj signal from the HO-OTUj frame constructed on the transmission side, and the ODU-demultiplexing unit 312 demultiplexes each of the parallel signals (and the multiplexed LO-ODUk signal) from the HO-ODUj signal. Each of the demultiplexed parallel signals (set as "MLD signals" or "second MLD signals") is output to the space switch 200. The same applies to the operation conducted by the line signal processing unit 300a-B that has received the optical signal 51-B.

The number of signals of the parallel fragmented signals 30-A allocated to the input (30-A) to the line signal processing unit 300a-A in the transmission node is N', and the number of signals of the parallel fragmented signals 31-A output as the output (31-A) from the line signal processing unit 300a-A in the reception node is N'.

In the same manner, the number of signals of the parallel fragmented signals 30-B allocated to the input (30-B) to the line signal processing unit 300a-B in the transmission node is N'', and the number of signals of the parallel fragmented signals 31-B output as the output (31-B) from the line signal processing unit 300a-B in the reception node is N''. At the space switch 200 in the reception node, the signals included in the parallel fragmented signals 31-A and the signals included in the parallel fragmented signals 31-B, namely, N'+N''=N signals in total, are output as the N parallel signals 21 to the client signal accommodating unit 100 (100-CC in FIG. 6) in the reception node.

The N parallel signals 21 input to the client signal accommodating unit 100 in the reception node are the N parallel signals subjected to the skew processing by the transmission MLD unit 102 in the transmission node, and are subjected to the deskew processing by the reception MLD unit 112 in the reception node, and recovered as an LO-ODUj signal. The client signal extraction unit 111 extracts the client signal from the recovered LO-ODUk signal, and outputs the client signal as the client signal 11.

In this manner, by providing the client signal accommodating unit 100 having the MLD processing function, the line signal processing unit 300a having the ODU asynchronous accommodation function in HO/LO, and the space switch 200 serving as the switch function, it is possible to transmit client signals distributed to a plurality of optical paths irrespective of the clock speed or the type (processing speed) of the optical transmission interface while coping with skew within an optical path including line signal processing. Further, by using the space switch as the switch function and providing the MLD processing function also to the line signal processing unit, it is possible to cause the LO-ODUk signal to be MLD-transmitted in the state of OTUk within the device and the LO-ODUk signal to be MLD-transmitted in the state of ODUk to coexist.

This embodiment is described by taking the configuration in which the optical path connects the transmission node and the reception node to each other, but at the space switch 200 as an intermediate node, all the N' parallel signals extracted from among the outputs (31-A) from the line signal processing unit 300a-A may be connected to the inputs 30 to another single line signal processing unit, or the N' parallel signals may be distributively connected to the inputs 30 to a plurality of other line signal processing units, to thereby also be able to transmit N' parallel fragmented signals by changing the optical path or by further increasing the optical paths to which the signals are to be distributed. In other words, the signal transmission between the line signal processing units (300) and between the client signal accommodating units (100) can also be conducted via the space switch 200 in the same manner.

Further, in the case of this embodiment, between the optical communication cross-connection devices serving as the node for signal transmission, the clock for the signal transmission is shared by the transmission MLD unit 102 of the client signal accommodating unit 100 of the optical communication cross-connection device on the transmission side and the reception MLD unit 112 of the client signal accommodating unit 100 of the optical communication cross-connection device on the reception side.

The present invention is not limited to each of the above-mentioned embodiments, and needless to say, the present invention includes all the possible combinations of those embodiments.

INDUSTRIAL APPLICABILITY

Note that, the optical communication cross-connection device and the signal processing method therefor according to the present invention are applicable to optical communication systems in various fields.

REFERENCE SIGNS LIST 100, 100-A, 100-B client signal accommodating unit,
101 LO-OTN accommodating unit, 102, 311 transmission MLD unit,
111 client signal extraction unit, 112, 301 reception MLD unit,
200 space switch,
300, 300-A, 300-B, 300a, 300a-A, 300a-B line signal processing unit,
301-1, 301-2, . . . , 301-x reception MLD processing unit,
302 ODU-multiplexing unit, 303 HO-OTU accommodating unit,
311-1, 311-2, . . . , 311-x' transmission MLD processing unit,
312 ODU-demultiplexing unit, 313 OTU frame reception unit,
400 electrical/optical signal converter, 410 optical/electrical signal converter.

The invention claimed is:

1. An optical communication cross-connection device for exchanging an OTN signal through optical communications, comprising:
a plurality of OTN signal processing units for asynchronously conducting OTN signal processing; and
a space switch connected between the plurality of OTN signal processing units, for conducting bidirectional signal exchange for the OTN signal,
wherein a first OTN signal processing unit and a second OTN signal processing unit that conduct signal transmission among the plurality of OTN signal processing units subject the OTN signal to skew processing on one side and deskew processing corresponding to the skew processing on another side between the first OTN signal processing unit and the second OTN signal processing unit or between a communicating end-side one of the first OTN signal processing unit and the second OTN signal processing unit and a communicating end-side OTN signal processing unit of an optical communication cross-connection device of a communication counterpart destination with respect to the optical communication cross-connection device, and share a clock for the signal transmission therebetween.

2. The optical communication cross-connection device according to claim 1, wherein the first OTN signal processing unit and the second OTN signal processing unit are each formed of any one of a client signal accommodating unit for conducting conversion processing between a client signal having an arbitrary format and the OTN signal and a line signal processing unit for converting an OTU signal between an LO-ODU signal and an HO-ODU signal.

3. The optical communication cross-connection device according to claim 2, wherein:
the first OTN signal processing unit is formed of the client signal accommodating unit;
the second OTN signal processing unit is formed of the line signal processing unit;
the client signal accommodating unit comprises:
an LO-OTN accommodating unit for asynchronously accommodating the client signal, which is an electrical signal input to the optical communication cross-connection device, in the LO-ODU signal, and outputting the LO-ODU signal as the OTU signal or an ODU signal;
a transmission MLD unit for outputting a signal output from the LO-OTN accommodating unit as a first MLD signal, which is a parallel signal subjected to skew signal processing by MLD, to the space switch;
a reception MLD unit for receiving a second MLD signal input from the line signal processing unit via the space switch, and recovering the OTU signal or the ODU signal from the second MLD signal by conducting the deskew processing for the second MLD signal; and
a client signal extraction unit for extracting the client signal from the OTU signal or the ODU signal that has been recovered, and outputting the client signal;
the line signal processing unit comprises:
a reception MLD unit for conducting the deskew processing for the first MLD signal input from the client signal accommodating unit via the space switch, and recovering the LO-ODU signal from the first MLD signal;
an ODU-multiplexing unit for asynchronously multiplexing the LO-ODU signal as the HO-ODU signal;
an HO-OTU accommodating unit for converting the HO-ODU signal obtained by the multiplexing into an OTU frame, and outputting the HO-ODU signal as an HO-OTU signal to an outside;
an OTU frame reception unit for extracting the HO-ODU signal from the OTU frame of the HO-OTU signal received from the outside;
an ODU-demultiplexing unit for extracting the LO-ODU signal from the extracted HO-ODU signal by demultiplexing; and
a transmission MLD unit for outputting the demultiplexed LO-ODU signal to the space switch as the second MLD signal, which is a parallel signal subjected to the skew signal processing by MLD; and
the transmission MLD unit and the reception MLD unit that conduct the signal transmission share the clock for the signal transmission.

4. The optical communication cross-connection device according to claim 2, wherein:
the first OTN signal processing unit is formed of the client signal accommodating unit;
the second OTN signal processing unit is formed of the line signal processing unit;
the client signal accommodating unit comprises:
an LO-OTN accommodating unit for asynchronously accommodating the client signal, which is an electrical signal input to the optical communication cross-connection device, in the LO-ODU signal, and outputting the LO-ODU signal as the OTU signal or an ODU signal;
a transmission MLD unit for outputting a signal output from the LO-OTN accommodating unit as an MLD signal, which is a parallel signal subjected to skew signal processing by MLD, to the space switch;
a reception MLD unit for receiving the LO-ODU signal, which is the MLD signal input from the line signal processing unit via the space switch and extracted by demultiplexing, and recovering the OTU signal or the ODU signal from the LO-ODU signal by conducting the deskew processing for the LO-ODU signal; and
a client signal extraction unit for extracting the client signal from the OTU signal or the ODU signal that has been recovered, and outputting the client signal;

the space switch outputs the MLD signal from the client signal accommodating unit to the line signal processing unit as a plurality of parallel fragmented signals, the line signal processing unit comprises:
- a second ODU-multiplexing unit for directly mapping the plurality of parallel fragmented signals of the LO-ODU signal input from the client signal accommodating unit via the space switch to ODTU of HO-ODU, and asynchronously multiplexing the plurality of parallel fragmented signals as the HO-ODU signal;
- an HO-OTU accommodating unit for converting the HO-ODU signal obtained by the multiplexing as the HO-ODU signal into the OTU frame, and outputting the HO-ODU signal as an HO-OTU signal to the optical communication cross-connection device of the communication counterpart destination with respect to the optical communication cross-connection device;
- an OTU frame reception unit for extracting the HO-ODU signal from the OTU frame of the HO-OTU signal received from the optical communication cross-connection device of the communication counterpart destination; and
- an ODU-demultiplexing unit for extracting the LO-ODU signal from the extracted HO-ODU signal by the demultiplexing, and outputting the LO-ODU signal to the space switch; and the transmission MLD unit of the client signal accommodating unit and the OTN signal processing unit of the optical communication cross-connection device of the communication counterpart destination share the clock for the signal transmission therebetween.

5. The optical communication cross-connection device according to claim 2, wherein:

the first OTN signal processing unit and the second OTN signal processing unit are both formed of the client signal accommodating unit;

the client signal accommodating unit comprises:
- an LO-OTN accommodating unit for asynchronously accommodating the client signal, which is an electrical signal input to the optical communication cross-connection device, in the LO-ODU signal, and outputting the LO-ODU signal as the OTU signal or an ODU signal;
- a transmission MLD unit for outputting a signal output from the LO-OTN accommodating unit as an MLD signal, which is a parallel signal subjected to skew signal processing by MLD, to the space switch;
- a reception MLD unit for receiving the MLD signal input via the space switch, and recovering the OTU signal or the ODU signal from the MLD signal by conducting the deskew processing for the MLD signal; and
- a client signal extraction unit for extracting the client signal from the OTU signal or the ODU signal that has been recovered, and outputting the client signal; and the transmission MLD unit and the reception MLD unit that conduct the signal transmission share the clock for the signal transmission.

6. The optical communication cross-connection device according to claim 2, wherein:

the first OTN signal processing unit and the second OTN signal processing unit are both formed of the line signal processing unit;

the line signal processing unit comprises:
- an OTU frame reception unit for extracting the HO-ODU signal from an OTU frame of an HO-OTU signal received from an outside;
- an ODU-demultiplexing unit for extracting the LO-ODU signal from the extracted HO-ODU signal by demultiplexing;
- a transmission MLD unit for outputting the demultiplexed LO-ODU signal to the space switch as an MLD signal, which is a parallel signal subjected to skew signal processing by MLD;
- a reception MLD unit for conducting the deskew processing for the MLD signal input via the space switch, and recovering the LO-ODU signal from the MLD signal;
- an ODU-multiplexing unit for asynchronously multiplexing the LO-ODU signal as the HO-ODU signal; and
- an HO-OTU accommodating unit for converting the HO-ODU signal obtained by the multiplexing into the OTU frame, and outputting the HO-ODU signal as the HO-OTU signal to the outside; and the transmission MLD unit and the reception MLD unit that conduct the signal transmission share the clock for the signal transmission.

7. A signal processing method for an optical communication cross-connection device in which a plurality of OTN signal processing units for conducting OTN signal processing are connected to a space switch for conducting bidirectional signal exchange for an OTN signal, the signal processing method comprising:
- conducting, by the plurality of OTN signal processing units, the OTN signal processing asynchronously; and
- subjecting, by a first OTN signal processing unit and a second OTN signal processing unit that conduct signal transmission among the plurality of OTN signal processing units, the OTN signal to skew processing on one side and deskew processing corresponding to the skew processing on another side between the first OTN signal processing unit and the second OTN signal processing unit or between a communicating end-side one of the first OTN signal processing unit and the second OTN signal processing unit and a communicating end-side OTN signal processing unit of an optical communication cross-connection device of a communication counterpart destination with respect to the optical communication cross-connection device, and sharing a clock for the signal transmission therebetween.

* * * * *